United States Patent
Lacy et al.

(10) Patent No.: US 9,796,048 B2
(45) Date of Patent: Oct. 24, 2017

(54) ARTICLE AND PROCESS FOR PRODUCING AN ARTICLE

(71) Applicant: GENERAL ELECTRIC COMPANY, Schenectady, NY (US)

(72) Inventors: Benjamin Paul Lacy, Greer, SC (US); Ariel Caesar Prepena Jacala, Travelers Rest, SC (US); Srikanth Chandrudu Kottilingam, Simpsonville, SC (US); David Edward Schick, Greenville, SC (US)

(73) Assignee: General Electric Company, Schenectady, NY (US)

(*) Notice: Subject to any disclaimer, the term of this patent is extended or adjusted under 35 U.S.C. 154(b) by 403 days.

(21) Appl. No.: 14/472,483

(22) Filed: Aug. 29, 2014

(65) Prior Publication Data
US 2016/0059437 A1 Mar. 3, 2016

(51) Int. Cl.
| | |
|---|---|
| *B23K 26/342* | (2014.01) |
| *B28B 1/00* | (2006.01) |
| *F28F 13/06* | (2006.01) |
| *B33Y 80/00* | (2015.01) |
| *F28F 3/02* | (2006.01) |
| *F28F 3/04* | (2006.01) |
| *F28F 13/08* | (2006.01) |
| *F01D 5/18* | (2006.01) |

(Continued)

(52) U.S. Cl.
CPC .......... *B23K 26/342* (2015.10); *B22F 3/1055* (2013.01); *B22F 7/004* (2013.01); *B28B 1/001* (2013.01); *B33Y 80/00* (2014.12); *C22C 1/0433* (2013.01); *C22C 33/0285* (2013.01); *F01D 5/187* (2013.01); *F01D 9/065* (2013.01); *F28F 3/022* (2013.01); *F28F 3/04* (2013.01); *F28F 13/06* (2013.01); *F28F 13/08* (2013.01); *B22F 2999/00* (2013.01); *B23K 2201/001* (2013.01); *F05D 2240/80* (2013.01); *F05D 2260/2212* (2013.01); *Y02P 10/295* (2015.11)

(58) Field of Classification Search
CPC ............ B23K 26/0006; B23K 26/0081; B23K 26/342; B23K 2201/001
See application file for complete search history.

(56) References Cited

U.S. PATENT DOCUMENTS

| | | | | |
|---|---|---|---|---|
| 5,595,703 A | * | 1/1997 | Swaelens | A61B 17/58 156/272.8 |
| 8,500,401 B1 | * | 8/2013 | Liang | F01D 5/186 415/1 |

(Continued)

FOREIGN PATENT DOCUMENTS

WO WO 2012131481 A1 * 10/2012 ............ B22F 3/1055

*Primary Examiner* — Ryan Reis
(74) *Attorney, Agent, or Firm* — McNees Wallace & Nurick LLC (57) ABSTRACT

An article and a process of producing an article are provided. The article includes a base material, a cooling feature arrangement positioned on the base material, the cooling feature arrangement including an additive-structured material, and a cover material. The cooling feature arrangement is between the base material and the cover material. The process of producing the article includes manufacturing a cooling feature arrangement by an additive manufacturing technique, and then positioning the cooling feature arrangement between a base material and a cover material.

19 Claims, 8 Drawing Sheets

(51) Int. Cl.
*F01D 9/06* (2006.01)
*B22F 3/105* (2006.01)
*B22F 7/00* (2006.01)
*C22C 1/04* (2006.01)
*C22C 33/02* (2006.01)
*B23K 101/00* (2006.01)

(56) References Cited

U.S. PATENT DOCUMENTS

| | | |
|---|---|---|
| 8,668,442 B2 | 3/2014 | Morris et al. |
| 2005/0241147 A1 | 11/2005 | Arnold et al. |
| 2006/0054079 A1 | 3/2006 | Withey et al. |
| 2010/0034647 A1* | 2/2010 | Lee ............... B23K 26/34 415/177 |
| 2010/0221567 A1 | 9/2010 | Budinger et al. |
| 2010/0257733 A1* | 10/2010 | Guo ............... B23K 26/18 29/889.1 |
| 2011/0135952 A1 | 6/2011 | Morris et al. |
| 2012/0000072 A9* | 1/2012 | Morrison ........... B22F 3/105 29/889.72 |
| 2012/0003086 A1 | 1/2012 | Morris et al. |
| 2012/0027507 A1* | 2/2012 | Meyer ............. B23K 15/0086 403/291 |
| 2013/0276461 A1* | 10/2013 | Propheter-Hinckley .. F01D 5/16 60/806 |
| 2014/0093392 A1* | 4/2014 | Tibbott ............. F01D 5/189 416/97 R |
| 2014/0216042 A1* | 8/2014 | Hanson ............. F23R 3/06 60/754 |

* cited by examiner

ARTICLE AND PROCESS FOR PRODUCING
AN ARTICLE

STATEMENT REGARDING FEDERALLY SPONSORED RESEARCH

This invention was made with government support under contract number DE-FC26-05NT42643 awarded by the Department of Energy. The government has certain rights in this invention.

FIELD OF THE INVENTION

The present invention is directed to an article and a process for producing an article. More specifically, the present invention is directed to an article having cooling features and a process of producing an article having cooling features.

BACKGROUND OF THE INVENTION

Turbine systems are continuously being modified to increase efficiency and decrease cost. One method for increasing the efficiency of a turbine system includes increasing the operating temperature of the turbine system. To increase the operating temperature of the turbine system, the individual components must be constructed to withstand the increased temperature.

One common method of increasing a temperature capability of a turbine component includes the use of cooling features. The cooling features are often formed in metals and alloys used in high temperature regions of gas turbines. Typically, the cooling features are cast on or within the component during manufacturing. Cooling features may also be formed through machining of the component after manufacture. However, it is difficult to form complex cooling features through casting and/or machining of the component.

Although it is possible to form more complex articles through additive manufacturing, many additive manufacturing techniques are limited in the materials that can be used. In particular, currently available additive manufacturing techniques are unable to form articles from materials able to withstand the operating temperatures of many turbine systems.

A process and an article that show one or more improvements in comparison to the prior art would be desirable in the art.

BRIEF DESCRIPTION OF THE INVENTION

In one embodiment, a process of producing an article includes manufacturing a cooling feature arrangement by an additive manufacturing technique, and then positioning the cooling feature arrangement between a base material and a cover material.

In another embodiment, a process of producing an article includes manufacturing a cooling feature arrangement by an additive manufacturing technique, the additive manufacturing technique including distributing a first layer of a material to a selected region, selectively laser melting the first layer, distributing at least one additional layer of the material over the first layer, selectively laser melting each of the at least one additional layers, and forming the cooling feature arrangement from the material; and positioning the cooling feature arrangement between a base material and a cover material. The cooling feature arrangement is formed from a cooling feature material.

In another embodiment, an article includes a base material, a cooling feature arrangement positioned on the base material, the cooling feature arrangement including an additive-structured material, and a cover material. The cooling feature arrangement is between the base material and the cover material.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an article and a process for producing an article. Embodiments of the present disclosure, for example, in comparison to concepts failing to include one or more of the features disclosed herein, increase cooling feature complexity, provide cooling features formed from additive manufacturing, decrease cooling feature stress, decrease cooling feature size, increase operating temperature tolerance of articles including cooling features formed from additive manufacturing, or a combination thereof.

Referring to FIGS. 1-7, an article 100 includes at least a base material 101, a cover material 105, and a cooling feature arrangement 103 positioned therebetween. The cooling feature arrangement 103 includes an additive-structured material formed by an additive manufacturing technique, and one or more cooling features 107. The cooling features 107 include, but are not limited to, pins 109, pin fins, bumps, turbulator strips, lattice structures, or a combination thereof. Additionally, the cooling features 107 include any suitable cross-sectional shape, such as, but not limited to, square, triangular, octagonal, circular, semi-circular, any other geometric shape, or a combination thereof. The cross-sectional shape of each of the one or more cooling features 107 may be uniform, substantially uniform, or varied. For example, the cooling features 107 may form rectangles, squares, cylinders, cones, triangles, hourglass shapes, parabolic shapes, or a combination thereof. In one embodiment, the cross-sectional shape of each of the one or more cooling features 107 is the same or substantially the same. In another embodiment, the cross-sectional shape of at least one of the cooling features 107 differs from the cross-sectional shape of at least one other cooling feature 107 in the cooling features arrangement 103. In a further embodiment, the cooling feature arrangement 103 includes one or more sections of the cooling features, the cross-sectional shape of the cooling features 107 in at least one section differing from the cross-sectional shape of the cooling features 107 in at least one other section.

The additive manufacturing technique forms near-net shape structures. As used herein "near-net shape" means that the cooling feature arrangement 103 is formed very close to the final shape of the cooling feature arrangement 103, not requiring significant traditional mechanical finishing techniques such as machining or grinding following the additive manufacturing. In one embodiment, the additive manufacturing technique includes, but is not limited to, the processes known to those of ordinary skill in the art as Direct Metal Laser Melting (DMLM), Direct Metal Laser Sintering (DMLS), Selective Laser Sintering (SLS), Selective Laser Melting (SLM), Electron Beam Melting (EBM), Fused Deposition Modeling (FDM), or a combination thereof.

In one embodiment, the DMLM includes distributing a first layer of a material to a selected region, selectively laser melting the first layer, distributing at least one additional layer of the material over the first layer, and selectively laser melting each of the at least one additional layers. The selective laser melting of the first layer and the at least one additional layer form the cooling feature arrangement 103. In another embodiment, the material is an atomized powder. In a further embodiment, the DMLM is performed in an inert gas atmosphere. In one embodiment, the FDM includes supplying a material to a nozzle, heating the nozzle, and extruding the material through the nozzle. The heating of the nozzle melts the material as the material passes through the nozzle. Upon extrusion of the material through the nozzle the material hardens, forming the cooling feature arrangement 103.

The additive manufacturing technique forms the cooling feature arrangement 103 from any material suitable for use with the additive manufacturing technique. Suitable materials include, but are not limited to, a metal, a ceramic, an alloy, a superalloy, steel, a stainless steel, a tool steel, nickel, cobalt, chrome, titanium, aluminum, or a combination thereof. In one embodiment, the material is a CoCrMo alloy, such as, but not limited to, 70Co-27Cr-3Mo. In another embodiment, the material is a ceramic matrix composite (CMC). In a further embodiment, the material has a composition, by weight, of: about 20% chromium, about 10% cobalt, about 8.5% molybdenum, up to about 2.5% titanium, about 1.5% aluminum, up to about 1.5% iron, up to about 0.3% manganese, up to about 0.15% silicon, about 0.06% carbon, about 0.005% boron, and balance nickel; or about 14 to about 28% chromium, about 10 to about 23% cobalt, about 1 to about 3% tungsten, about 1.5 to about 4.5% titanium, about 1.5 to about 4.5% aluminum, about 0.05 to about 0.2% carbon, about 0.8 to about 3% niobium, about 0.002 to about 0.012% boron, and balance nickel, the atomic ratio of aluminum to titanium being greater than about 1.0.

Other materials include, for example, a composition, by weight, of: about 10% nickel, about 29% chromium, about 7% tungsten, about 1% iron, about 0.25% carbon, about 0.01% boron, and balance cobalt (e.g., FSX414); about 0.015% boron, about 0.05% to about 0.15% carbon, about 20% to about 24% chromium, about 3% iron, about 0.02% to about 0.12% lanthium, about 1.25% manganese, about 20% to about 24% nickel, about 0.2% to about 0.5% silicon, about 13% to about 15% tungsten, and balance cobalt (e.g., HAYNES® 188); about 22.5% to about 24.25% chromium, up to about 0.3% titanium (e.g., about 0.15% to about 0.3% titanium), about 6.5% to about 7.5% tungsten, about 9% to about 11% nickel, about 3% to about 4% tantalum, up to about 0.65% carbon (e.g., about 0.55% to about 0.65% carbon), up to about 0.55% zirconium (e.g., about 0.45% to about 0.55% zirconium), and balance cobalt (e.g., Mar-M-509); about 0.05% carbon, about 20% nickel, about 20% chromium, about 0.1% zirconium, about 7.5% tantalum, and balance cobalt (e.g., Mar-M-918); about 6.6% to about 7.0% chromium, about 11.45% to about 12.05% cobalt, about 5.94% to about 6.30% aluminum, about 0.02% titanium, about 4.70% to about 5.10% tungsten, about 1.3% to about 1.7% molybdenum, about 2.6% to about 3.0% rhenium, about 6.20% to about 6.50% tantalum, about 1.3% to about 1.7% hafnium, about 0.10% to about 0.14% carbon, about 0.0035% manganese, about 0.03% zirconium, about 0.01% to about 0.02% boron, about 0.2% iron, about 0.06% silicon, about 0.1% potassium, about 0.004% sulfur, about 0.1% niobium, and balance nickel (e.g., Rene 142); about 13.70% to about 14.30% chromium, about 9% to about 10% cobalt, about 3.2% aluminum, about 4.8% to about 5.20% titanium, about 3.7% to about 4.3% tungsten, about 0.1% rhenium, up to about 4.3% rhenium and tungsten combined, about 0.5% tantalum, about 0.1% hafnium, about 0.15% to about 0.19% carbon, about 0.15% palladium, about 0.3% platinum, about 0.01% magnesium, about 0.02% to about 0.1% zirconium, about 0.01% to about 0.02% boron, about 0.35% iron, about 0.1% silicon, about 0.1% manganese, about 0.015% phosphorus, about 0.0075% sulfur, about 0.1% niobium, and balance nickel (e.g., René 80); about 0.08 to about 0.12% carbon, about 22.2 to about 22.8% chromium, about 0.10% manganese, about 0.25% silicon, about 18.5 to about 19.5% cobalt, about 1.8 to about 2.2% tungsten, about 2.3% titanium, about 1.2% aluminum, about 1.0% tantalum, about 0.8% niobium, about 0.05% zirconium, about 0.008% boron, and balance nickel (e.g., GTD-222®, available from General Electric Company); about 20% to about 24% chromium, about 10% to about 15% cobalt, about 8% to about 10% molybdenum, about 0.8% to about 1.5% aluminum, about 0.05% to about 0.15% carbon, about 3.0% iron, about 1.0% manganese, about 0.015% silicon, about 0.015% sulfur, about 0.6% titanium, about 0.5% copper, about 0.006% boron, and balance nickel (e.g., INCONEL® 617); about 5% iron, about 20% to about 23% chromium, up to about 0.5% silicon, about 8% to about 10% molybdenum, up to about 0.5% manganese, up to about 0.1% carbon, and balance nickel (e.g., INCONEL® 625); or about 50% to about 55% nickel and cobalt combined, about 17% to about 21% chromium, about 4.75% to about 5.50% niobium and tantalum combined, about 0.08% carbon, about 0.35% manganese, about 0.35% silicon, about 0.015% phosphorus, about 0.015% sulfur, about 1.0% cobalt, about 0.35% to 0.80% aluminum, about 2.80% to about 3.30% molybdenum, about 0.65% to about 1.15% titanium, about 0.001% to about 0.006% boron, about 0.15% copper, and balance of iron (e.g., INCONEL® 718).

"INCONEL" is a federally registered trademark of alloys produced by Huntington Alloys Corporation, Hungtington, W. Va. "HAYNES" is a federally registered trademark of alloys produced by Haynes International, Inc., Kokomo, Ind.

The base material 101 and the cover material 105 include the same, substantially the same, or different materials. In one embodiment, the base material 101 and/or the cover material 105 are formed from any material suitable for the hot-gas path of a turbine system, such as, but not limited to, nickel-based superalloys, cobalt-based superalloys, or other suitable superalloys. In another embodiment, the base material 101 and/or the cover material 105 include more than one material, such as, for example, a substrate and an intermediate layer. One suitable material for the base material 101 and/or the cover material 105 includes a composition, by weight, of between about 8.0% and about 8.7% chromium, between about 9% and about 10% cobalt, between about 5.25% and about 5.75% aluminum, up to about 0.9% titanium (for example, between about 0.6% and about 0.9%), between about 9.3% and about 9.7% tungsten, up to about 0.6% molybdenum (for example, between about 0.4% and about 0.6%), between about 2.8% and about 3.3% tantalum, between about 1.3% and about 1.7% hafnium, up to about 0.1% carbon (for example, between about 0.07% and about 0.1%), up to about 0.02% zirconium (for example, between about 0.005% and about 0.02%), up to about 0.02% boron (for example, between about 0.01% and about 0.02%), up to about 0.2% iron, up to about 0.12% silicon, up to about 0.1% manganese, up to about 0.1% copper, up to about 0.01% phosphorus, up to about 0.004% sulfur, up to about 0.1% niobium, incidental impurities, and a balance of nickel. Another suitable material for the base material 101 and/or the cover material 105 includes a composition, by weight, of about 7.5% cobalt, about 7.5% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, between about 0.002% and about 0.03% yttrium, and a balance of nickel.

In another embodiment, the cover material 105 includes a pre-sintered preform (PSP), such as, but not limited to, one or more PSP strips, one or more PSP chiclets, one or more PSP cover foils, one or more other suitable PSP structures, or a combination thereof. In a further embodiment, the PSP contains at least two materials with various mixing percentages. A first material includes, for example, any of the materials suitable for the hot-gas path of a turbine system disclosed herein. A second material includes, for example, a nickel braze alloy, such as, but not limited to, a material having a composition, by weight, of between about 13% and about 15% chromium, between about 9% and about 11% cobalt, between about 2.25% and about 2.75% tantalum, between about 3.25% and about 3.75% aluminum, between about 2.5% and about 3% boron, up to about 0.1% yttrium (for example, between about 0.02% and about 0.1% yttrium), and a balance of nickel; or between about 18.5% and about 19.5% chromium, between about 9.5% and about 10.5% silicon, about 0.1% cobalt, about 0.03% boron, about 0.06% carbon, and a balance of nickel.

The base material 101 and the cover material 105 at least partially surround the cooling feature arrangement 103 positioned within the article 100. In one embodiment, the base material 101 and the cover material 105 are suitable for use at increased temperatures as compared to the material used to form the cooling feature arrangement 103. For example, in another embodiment, the material used to form the cooling feature arrangement 103 is suitable for use at temperatures up to 1000° F., and the base material 101 and the cover material 105 are suitable for use at temperatures above 1000° F. In another example, the material used to form the cooling feature arrangement 103 is suitable for use at temperatures up to 1600° F., and the base material 101 and the cover material 105 are suitable for use at temperatures above 1600° F. In a further example, the material used to form the cooling feature arrangement 103 is suitable for use at temperatures up to 1800° F., and the base material 101 and the cover material 105 are suitable for use at temperatures above 1800° F. In a further embodiment, at least partially surrounding the cooling feature arrangement 103 with the base material 101 and the cover material 105 increases the temperature at which the cooling feature arrangement 103 is suitable for use. By increasing the temperature at which the cooling feature arrangement 103 is suitable for use, at least partially surrounding the cooling feature arrangement 103 with the base material 101 and the cover material 105 provides an ability to form the cooling feature arrangement 103 from materials that are not suitable for direct exposure to the operating temperatures of the article 100. Additionally, when the additive manufacturing technique is not capable of forming structures from materials suitable for use at or above the operating temperature of the article 100, at least partially surrounding the cooling feature arrangement 103 with the base material 101 and the cover material 105 provides an ability to form the cooling feature arrangement 103 with the additive manufacturing technique. Forming the cooling feature arrangement 103 with the additive manufacturing technique increases an ability to form complex cooling features 107 and/or decrease a size of the cooling features 107 as compared to other manufacturing techniques (e.g., casting, machining).

A method of producing the article 100 includes manufacturing the cooling feature arrangement 103 by the additive manufacturing technique, and then positioning the cooling feature arrangement 103 between the base material 101 and the cover material 105. The cooling feature arrangement 103 formed by the additive manufacturing technique includes any suitable geometry and/or orientation. For example, in one embodiment, the cooling features 107 include a plurality of the pins 109 forming a pin bank, a cross-sectional geometry of the pins 109 being oval, square, circular, rectangular, triangular, polygonal, constant, substantially constant, varying, or a combination thereof. In another embodiment, the cooling features 107 extend from a surface in the same, similar, and/or different directions. For example, the cooling features 107 may be perpendicular to the surface, non-perpendicular to the surface and parallel to each other, non-perpendicular to the surface and non-parallel to each other, or a combination thereof. In a further embodiment, the cooling features 107 extend from the surface with the same or differing heights. For example, the cooling feature arrangement 103 may include a first row of the cooling features 107 having a first height, and a second row of the cooling features 107 having a second height, the second height differing from the first height. Additional rows with additional heights may be provided to form a height profile, such as, but not limited to, an increasing height profile, a staggered height profile, a gradient, or a combination thereof. As discussed in further detail below, the cooling feature arrangement 103 is either formed as a single piece, or as multiple pieces which are assembled together.

Figure 1:
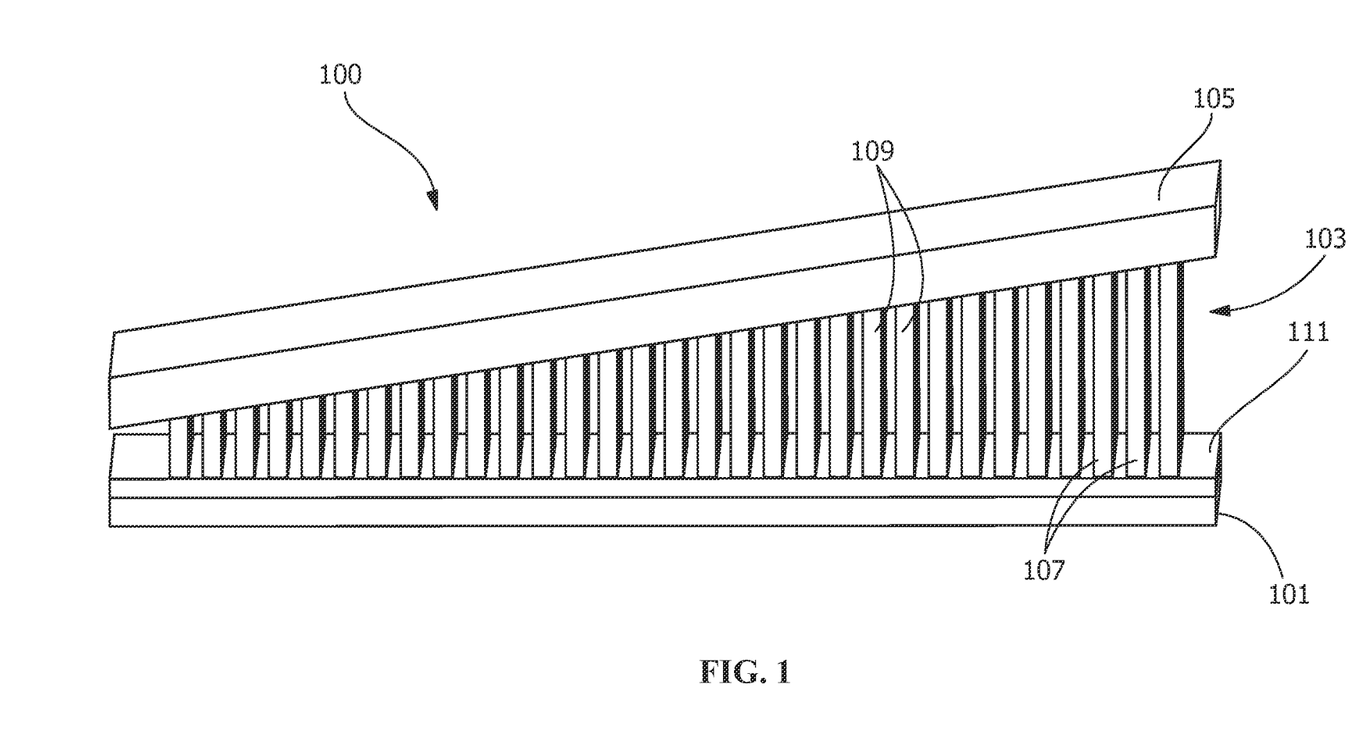
FIG. 1 is a perspective view of a cooling feature arrangement, according to an embodiment of the disclosure.
Figure 2:
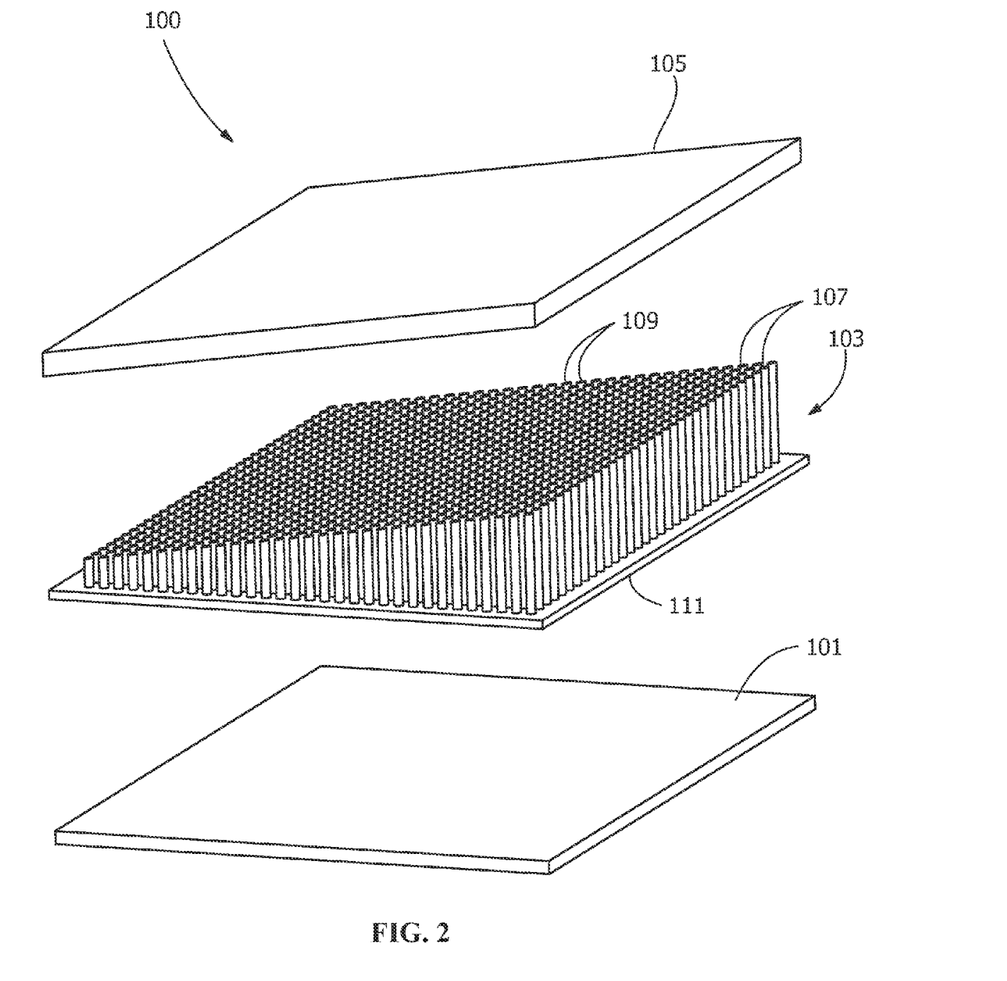
FIG. 2 is an exploded view of the cooling feature arrangement of FIG. 1.
Figure 7:
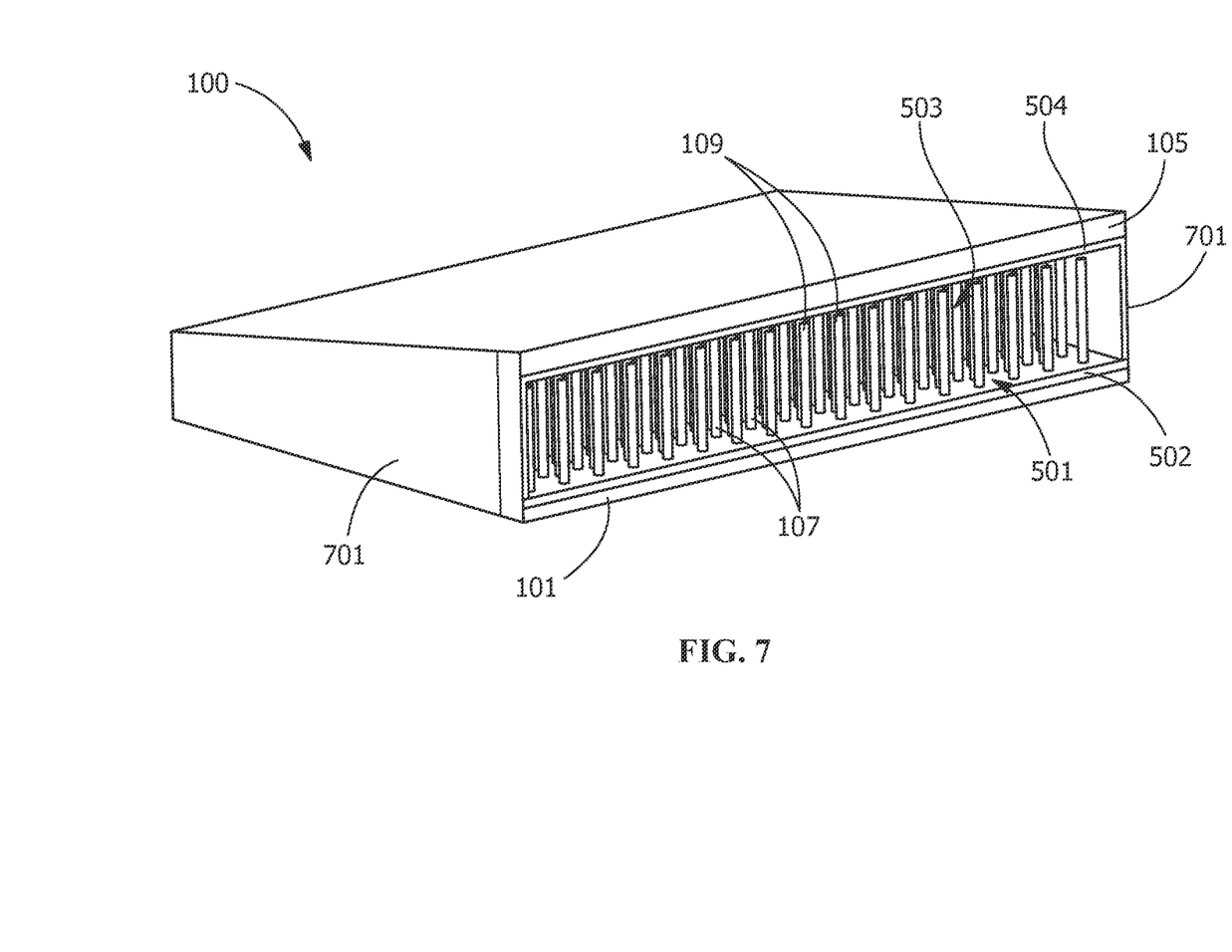
FIG. 7 is a perspective view of the cooling feature arrangement of FIG. 5 with side portions secured thereto.

Referring to FIGS. 1 and 2, in one embodiment, the cooling features 107 extend from a cooling feature support 111. The cooling feature support 111 is provided separate from the base material 101 and the cover material 105. Additionally, the cooling feature support 111 may be provided separate from the cooling features 107, or may be formed with the cooling features 107 by the additive manufacturing technique. After providing the cooling feature support 111 and/or forming the cooling features 107, the cooling feature support 111 is positioned adjacent the base material 101. In another embodiment, the cooling feature support 111 is secured to the base material 101 by any suitable securing method, such as, but not limited to, brazing, welding, diffusion bonding, mechanical bonding, any other adhesive method, or a combination thereof. In a further embodiment, the cover material 105 is secured to the cooling features 107, opposite the base material 101. Additionally or alternatively, the cover material 105 is secured to the base material 101 with side portions 701 (FIG. 7). In another alternative embodiment, the cover material 105 is adjacent to the cooling features 107 without being secured thereto, reducing the stress applied to the cooling feature arrangement 103 when the cover material 105 and the base material 101 move relative to each other. As will be appreciated by one skilled in the art, the orientation of the cooling feature arrangement 103 may be reversed such that the cooling feature support 111 is adjacent and/or secured to the cover material 105 and the cooling features 107 are adjacent and/or secure to the base material 101.

Figure 3:
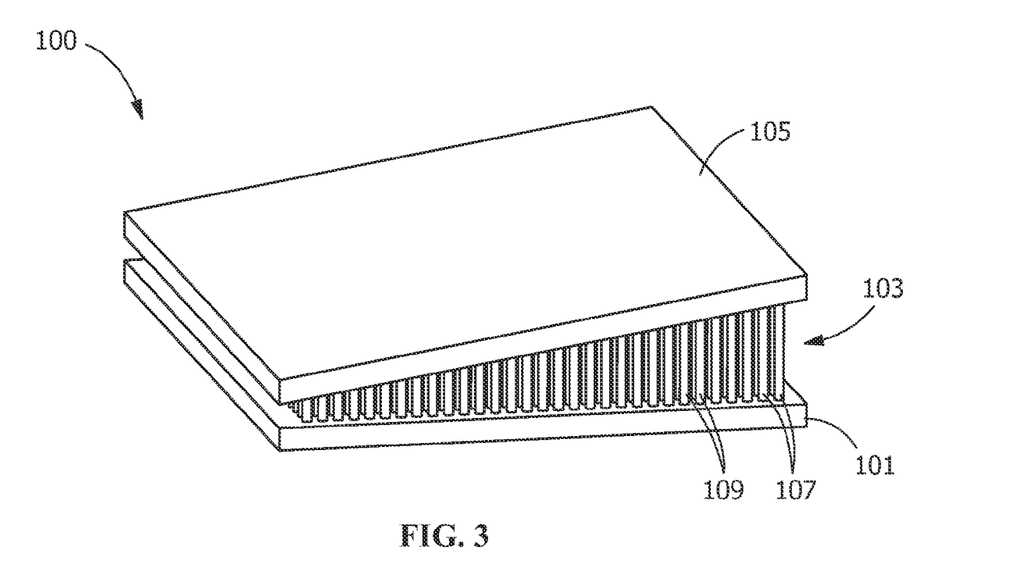
FIG. 3 is a perspective view of a cooling feature arrangement, according to an embodiment of the disclosure.
Figure 4:
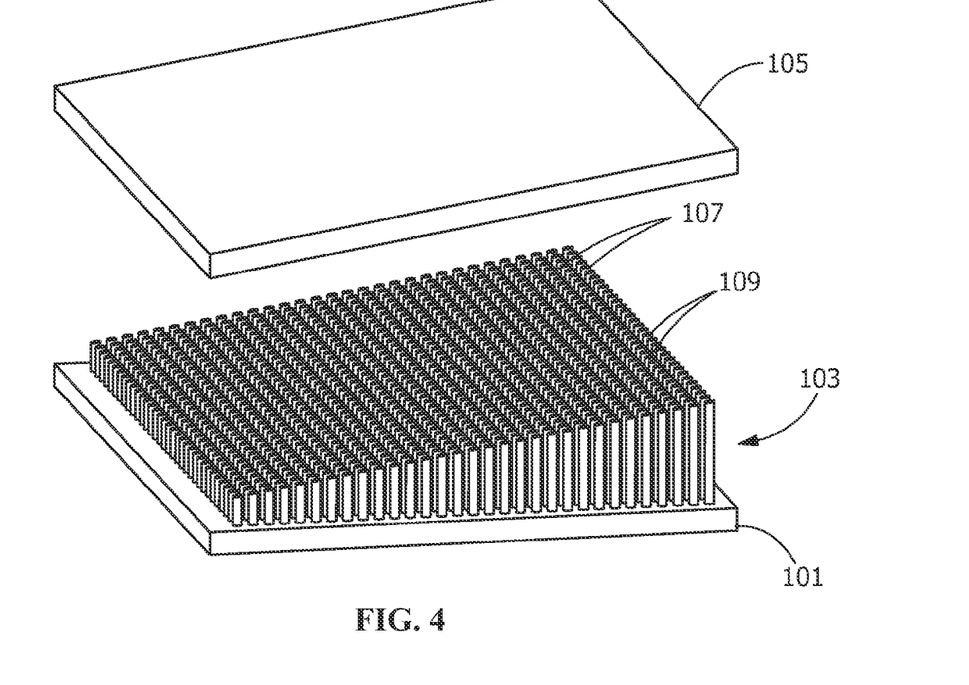
FIG. 4 is an exploded view of the cooling feature arrangement of FIG. 3.

Referring to FIGS. 3 and 4, in one embodiment, the cooling features 107 are formed directly on the base material 101 by the additive manufacturing technique. Forming the cooling features 107 directly on the base material 101 eliminates the separate cooling feature support 111 and/or the securing of the cooling feature support 111 to the base material 101. The cover material 105 is positioned adjacent the cooling features 107 to form the article 100. In another embodiment, the cover material 105 is secured to the cooling features 107 extending from the base material 101. Additionally or alternatively, the cover material 105 is secured to the base material 101 with side portions 701 (FIG. 7).

Figure 5:
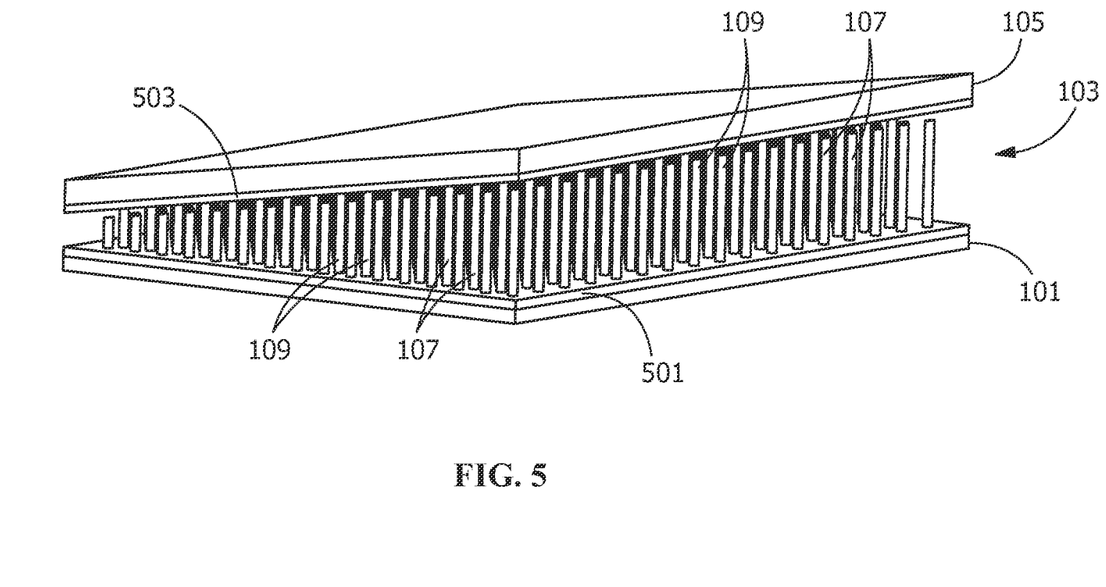
FIG. 5 is a perspective view of a cooling feature arrangement, according to an embodiment of the disclosure.
Figure 6:
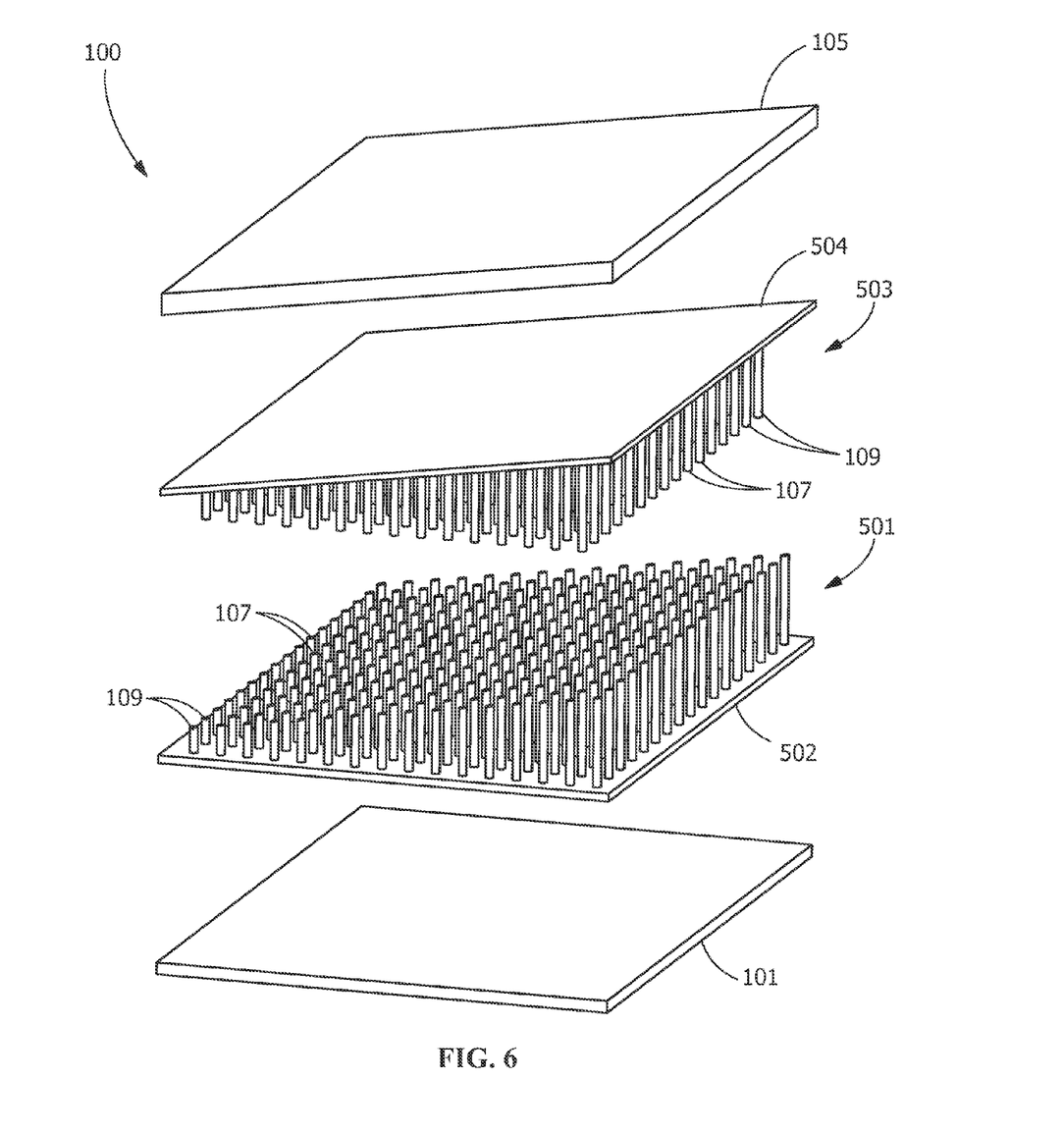
FIG. 6 is an exploded view of the cooling feature arrangement of FIG. 5.

Referring to FIGS. 5-7, in one embodiment, the cooling feature arrangement 103 includes a first cooling feature arrangement 501 and a second cooling feature arrangement 503. In another embodiment, the first cooling feature arrangement 501 and the second cooling feature arrangement 503 each include a plurality of the pins 109. In a further embodiment, the first cooling feature arrangement 501 is positioned adjacent the base material 101, and the second cooling feature arrangement 503 is positioned adjacent the cover material 105. As most clearly illustrated in FIG. 6, in one embodiment, the first cooling feature arrangement 501 is formed on a first cooling feature support 502, and the second cooling feature arrangement 503 is formed on a second fooling feature support 504. In another embodiment, the first cooling feature arrangement 501 and/or the second cooling feature arrangement 503 are formed directly on the base material 101 and/or the cover material 105, respectively.

The first cooling feature arrangement 501 and the second cooling feature arrangement 503 are oriented relative to each other such that the cooling features 107 of one arrangement extend between the cooling features 107 of the other. Together, the first cooling feature arrangement 501 and the second cooling feature arrangement 503 form a dense pin-bank within the article 100. For example, referring to FIG. 5, the pins 109 extending from the first cooling feature arrangement 501 extend towards the cover material 105 and between the pins 109 of the second cooling feature arrangement 503, while the pins 109 extending from the second cooling feature arrangement 503 extend towards the base material 101 and between the pins 109 of the first cooling feature arrangement 501. The pins 109 are either secured to the opposite surface (e.g., the base material 101, the cover material 105, or the cooling feature support 111), or they extend towards the opposite surface without contacting or being secured thereto. As previously discussed, securing the cooling feature arrangement 103 to, at most, the base material 101 or the cover material 105, reduces the stress applied to the cooling features 107. Referring to FIG. 7, in one embodiment, the side portions 701 secure the cover material 105 to the base material 101, at least partially surrounding the cooling feature arrangement 503 therein.

Alternatively, the first cooling feature support 502 is positioned adjacent the second cooling feature support 504, such that the first cooling feature arrangement 501 and the second cooling feature arrangement 503 extend away from each other. When positioned between the base material 101 and the cover material 105, the first cooling feature arrangement 501 extends towards the base material 101, and the second cooling feature arrangement 503 extends towards the cover material 105, or vice versa. In one embodiment, the cooling features 107 of the first cooling feature arrangement 501 include a first profile, and the cooling features 107 of the second cooling feature arrangement 503 include a second profile. In another embodiment, the first profile differs from the second profile. In a further embodiment, the first profile provides the cooling features 107 formed to substantially mirror a contour of the base material 101, and the second profile provides the cooling features 107 formed to substantially mirror a contour of the cover material 105.

Figure 8:
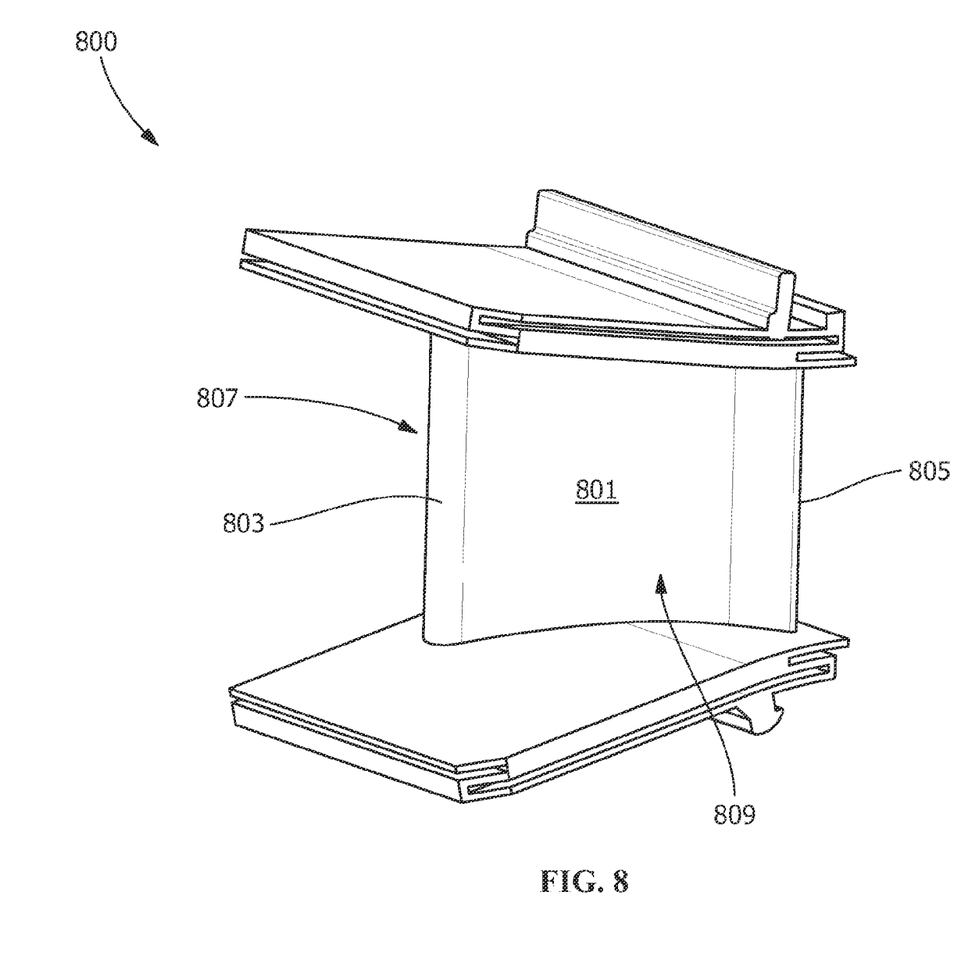
FIG. 8 is a perspective view of a turbine nozzle.

In one embodiment, the article 100 forms at least a portion of a component 800. The component 800 includes any suitable component for positioning at least one cooling feature therein. Suitable components include, for example, turbine buckets, turbine shrouds, turbine nozzles 800 (FIG. 8), impingement sleeve, other hot gas path components, or any other cooled component. As illustrated in FIG. 8, the turbine nozzle 800 includes an airfoil portion 801 with a leading edge 803 and a trailing edge 805. In one embodiment, the article 100 forms the trailing edge 805 of the turbine nozzle 800, the base material 101 forming the suction side 807 and the cover material 105 forming the pressure side 809.

Figure 9:
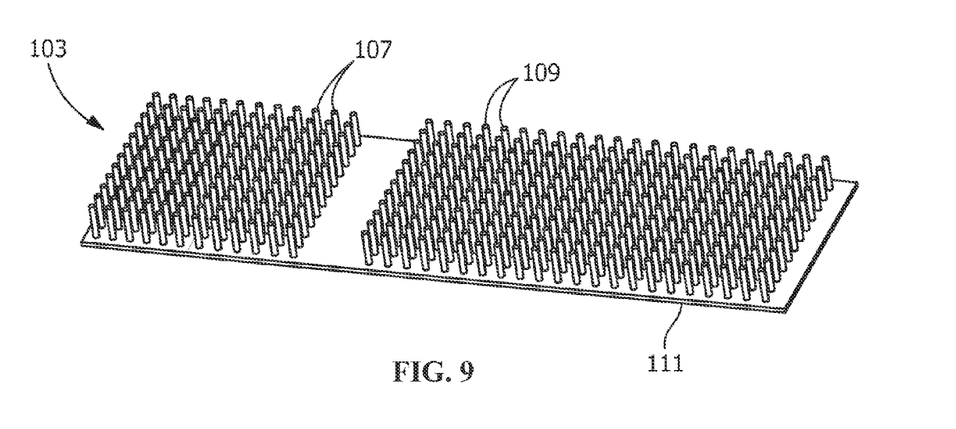
FIG. 9 is a perspective view of a cooling feature arrangement according to an embodiment of the disclosure.
Figure 10:
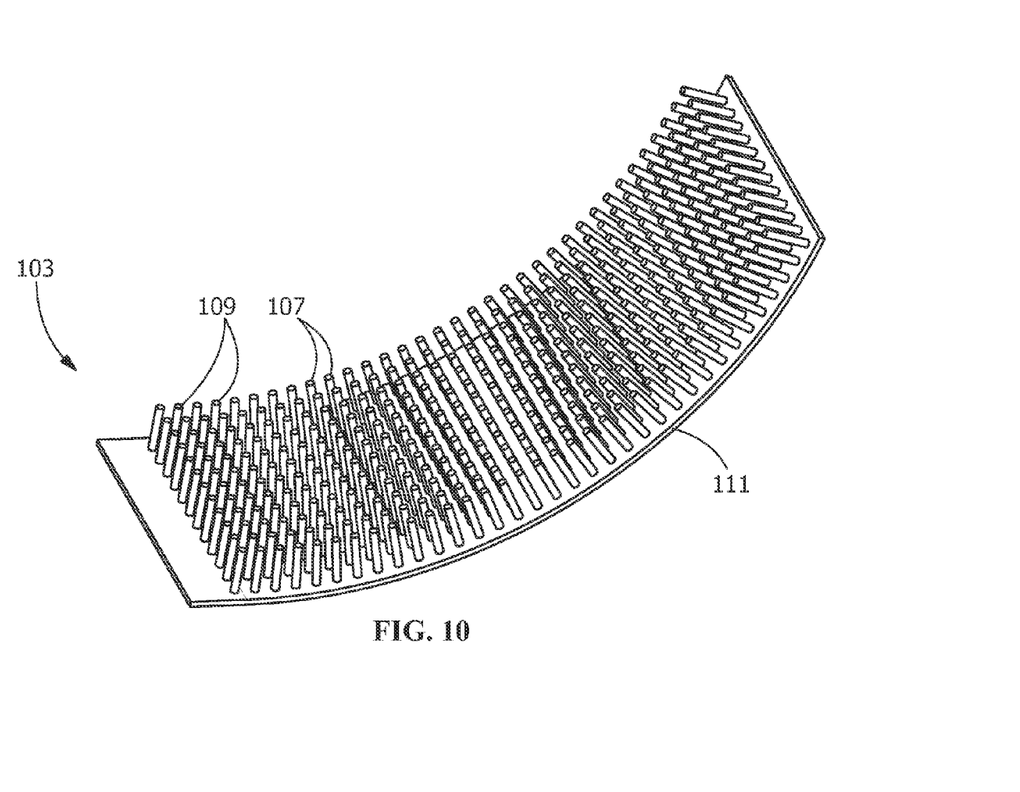
FIG. 10 is a perspective view of a cooling feature arrangement according to an embodiment of the disclosure.

As illustrated in FIGS. 1-7, the article 100 forming the trailing edge 805 (see FIG. 8) includes the cooling features 107 extending from a flat or substantially flat surface (e.g., the base material 101 or the cooling feature support 111). In an alternate embodiment, referring to FIGS. 9-10, the cooling features 107 extend from a curved surface, such as, but not limited to, the base material 101 and/or the cooling feature support 111. The article 100 including the curved surface also includes the cover material 105 having a corresponding curvature. The article 100 including the curved surface is formed according to any of the embodiments disclosed herein. For example, the cover material 105 may secured to the cooling features 107, secured to the base material 101, or positioned adjacent to the cooling feature arrangement 103, the article 100 may include the first cooling feature arrangement 501 curving inward and the second cooling feature arrangement 503 curving outward, or a combination thereof. As illustrated in FIG. 9, in one embodiment, the cooling features 107 extending from the curved surface form the cooling feature arrangement 103 configured to be positioned between the leading edge 803 and the trailing edge 805. As illustrated in FIG. 10, in another embodiment, the cooling features 107 extending from the curved surface form the cooling feature arrangement 103 configured to be positioned within the leading edge 803.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A process of producing a turbine article, the process comprising:
   manufacturing a cooling feature arrangement by an additive manufacturing technique;
   positioning the cooling feature arrangement between a base material and a cover material; and
   securing the cooling feature arrangement to the base material to form the turbine article;
   wherein the securing of the cooling feature arrangement comprises a method selected from the group consisting of brazing, welding, diffusion bonding, mechanical, additive manufacturing, and combinations thereof;
   wherein the forming of the cooling feature arrangement comprises forming at least one feature selected from the group consisting of pins, pin fins, bumps, turbulator strips, and combinations thereof; and
   wherein the forming of the cooling feature arrangement does not comprise forming a lattice structure.

2. The process of claim 1, wherein the additive manufacturing technique comprises:
   distributing a first layer of a material to a selected region;
   selectively laser melting the first layer;
   distributing at least one additional layer of the material over the first layer;
   selectively laser melting each of the at least one additional layers; and
   forming the cooling feature arrangement from the material.

3. The process of claim 1, wherein the additive manufacturing technique comprises:
   supplying a material to a nozzle;
   heating the nozzle;
   extruding the material through the nozzle, the heating of the nozzle melting the
   material as the material passes through the nozzle; and
   forming the cooling feature arrangement from the material;
   wherein the material hardens upon the extruding of the material through the nozzle.

4. The process of claim 1, wherein the manufacturing of the cooling feature arrangement comprises forming a first row of cooling features having a first height and a second row of cooling features having a second height, the second height being greater than the first height.

5. The process of claim 4, further comprising forming at least one additional row of cooling features, the additional row of cooling features providing an increasing height profile.

6. The process of claim 1, further comprising securing the cover material to the cooling feature arrangement, opposite the base material.

7. The process of claim 1, wherein the forming of the cooling feature arrangement comprises forming a pinbank.

8. The process of claim 1, wherein the forming of the cooling feature arrangement further comprises forming a first cooling feature arrangement and a second cooling feature arrangement.

9. The process of claim 8, further comprising securing the first cooling feature arrangement to the base material, and securing the second cooling feature arrangement to the cover material.

10. The process of claim 9, further comprising positioning cooling features extending from the first cooling feature arrangement between cooling features extending from the second cooling feature arrangement.

11. The process of claim 1, wherein the forming of the cooling feature arrangement further comprises forming cooling features on the base material.

12. The process of claim 1, wherein the base material comprises a substrate and an intermediate layer.

13. The process of claim 1, wherein the cover material comprises a substrate and an intermediate layer.

14. The process of claim 1, wherein the cooling feature arrangement is formed from a cooling feature material, the cooling feature material differing from the base material and the cover material.

15. The process of claim 1, wherein the article is selected from the group consisting of a turbine bucket, a turbine nozzle, a turbine shroud, and an impingement sleeve.

16. A process of producing an article, the process comprising:
   manufacturing a cooling feature arrangement by an additive manufacturing technique, the additive manufacturing technique including:
      distributing a first layer of a material to a selected region;
      selectively laser melting the first layer;
      distributing at least one additional layer of the material over the first layer;
      selectively laser melting each of the at least one additional layers; and
      forming the cooling feature arrangement from the material; and
   positioning the cooling feature arrangement between a base material and a cover material;
   wherein the cooling feature arrangement is formed from a cooling feature material;
   wherein the forming of the cooling feature arrangement comprises forming at least one feature selected from the group consisting of pins, pin fins, bumps, turbulator strips, and combinations thereof; and
   wherein the forming of the cooling feature arrangement does not comprise forming a lattice structure.

17. A turbine article, comprising:
   a base material;
   a cooling feature arrangement positioned on the base material, the cooling feature arrangement including an additive-structured material; and
   a cover material;
   wherein the cooling feature arrangement is configured to be positioned between a leading edge and a trailing edge of an airfoil of the turbine article;
   wherein the cooling feature arrangement comprises at least one feature selected from the group consisting of pins, pin fins, bumps, turbulator strips, and combinations thereof; and
   wherein the cooling feature arrangement does not comprise a lattice structure.

18. A process of producing an article, the process comprising:

manufacturing a cooling feature arrangement by an additive manufacturing technique;
wherein the addictive manufacturing technique comprises:
  supplying a material to a nozzle;
  heating the nozzle;
  extruding the material through the nozzle, the heating of the nozzle melting the material as the material passes through the nozzle; and
  forming the cooling feature arrangement from the material;
  wherein the material hardens upon the extruding of the material through the nozzle;
positioning the cooling feature arrangement between a base material and a cover material;
wherein the forming of the cooling feature arrangement comprises forming at least one feature selected from the group consisting of pins, pin fins, bumps, turbulator strips, and combinations thereof; and
wherein the forming of the cooling feature arrangement does not comprise forming a lattice structure.

19. The process of claim 1, wherein the cooling feature arrangement is positioned adjacent to the cover material.

\* \* \* \* \*